(12) United States Patent
Barablin et al.

(10) Patent No.: US 10,003,844 B2
(45) Date of Patent: Jun. 19, 2018

(54) AUTOMATED RETRIEVAL OF SOCIAL MEDIA TAGS

(71) Applicant: ARRIS Enterprises, Inc., Suwanee, GA (US)

(72) Inventors: Dmitry Barablin, Lawrenceville, GA (US); Sergey Kozlov, Billerica, MA (US); Andrei Nikolayevich Grigorev, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days. days.

(21) Appl. No.: 14/951,957

(22) Filed: Nov. 25, 2015

(65) Prior Publication Data

US 2016/0150268 A1   May 26, 2016

Related U.S. Application Data

(60) Provisional application No. 62/084,201, filed on Nov. 25, 2014.

(51) Int. Cl.
| | |
|---|---|
| *G06F 3/00* | (2006.01) |
| *G06F 13/00* | (2006.01) |
| *H04N 5/445* | (2011.01) |
| *H04N 21/431* | (2011.01) |
| *H04N 21/61* | (2011.01) |
| *H04N 21/4788* | (2011.01) |
| *H04N 21/488* | (2011.01) |
| *H04N 21/44* | (2011.01) |

(52) U.S. Cl.
CPC ... *H04N 21/4312* (2013.01); *H04N 21/44008* (2013.01); *H04N 21/4788* (2013.01); *H04N 21/4882* (2013.01); *H04N 21/4884* (2013.01); *H04N 21/6125* (2013.01)

(58) Field of Classification Search
CPC .......... H04N 21/4312; H04N 21/6125; H04N 21/4788; H04N 21/4882; H04N 21/4884
See application file for complete search history.

(56) References Cited

U.S. PATENT DOCUMENTS

| | | | | |
|---|---|---|---|---|
| 2014/0366052 | A1* | 12/2014 | Ives ................. | H04N 21/23418 725/19 |
| 2015/0106828 | A1* | 4/2015 | Gubesi ............... | H04N 21/4725 725/12 |
| 2015/0312635 | A1* | 10/2015 | Charania ............ | H04N 21/4788 725/43 |

* cited by examiner

*Primary Examiner* — Oschta Montoya
(74) *Attorney, Agent, or Firm* — Bart A. Perkins

(57) ABSTRACT

Methods, systems, and computer readable media can be operable to facilitate the retrieval of a social media tag associated with a content stream. A social media tag associated with a content stream received by a customer premise equipment (CPE) device may be detected and identified, and the social media tag may be presented to a user. The social media tag may be presented to a user along with the underlying multimedia content associated with the content stream, and/or may be delivered to a user device or account. A user interface including the identified social media tag may be presented to a user, and the user may be given the option to receive messages associated with the identified social media tag. Messages associated with the identified social media tag may be updated and presented to the user along with the underlying multimedia content.

11 Claims, 11 Drawing Sheets

AUTOMATED RETRIEVAL OF SOCIAL MEDIA TAGS

CROSS REFERENCE TO RELATED APPLICATION

This application is a non-provisional application claiming the benefit of U.S. Provisional Application Ser. No. 62/084,201, entitled "Automated Retrieval of Social Media Tags for Currently Tuned Program," which was filed on Nov. 25, 2014, and is incorporated herein by reference in its entirety.

TECHNICAL FIELD

This disclosure relates to the retrieval of social media tags.

BACKGROUND

Social media provides an arena for discussion of a plethora of current events and topics, and social media discussion is especially engrained in television programs and events. Many television programs and events carried on various television channels promote themselves through social media tags or identifiers such as hashtag bugs. Typically, social media tags associated with a television program or event are displayed to a viewer as digital on-screen graphics. The social media tags are used to promote a backchannel of online discussion. Viewers can share their thoughts and opinions before, during, and after the broadcast of a program or event.

However, it is often inconvenient for the viewer to watch a television program while simultaneously keeping up to date with the latest social media posts or tweets about the program being viewed. In order to get the latest social media updates, a viewer generally has to redirect attention to a device other than the one being used to display the program, manually enter, at the other device, the social media tag presented on the display device, and then focus attention on the other device to read social media posts. This method of searching for and following relevant social media posts takes time and creates various problems for the viewer who would like to stay up to date with online discussion while also viewing a television program or event. The viewer is forced to open a social media website or application and manually enter social media tags displayed on the display device. This task can consume the viewer's focus as social media tags, such as hashtags, often have special non-standard spelling and can be quite long. Moreover, the viewer's attention is distracted from the display screen while the second screen is used for reading social media feeds. Therefore, it is desirable to improve upon methods and systems for discovering and following social media tags associated with a television program or event.

BRIEF DESCRIPTION OF THE DRAWINGS

Like reference numbers and designations in the various drawings indicate like elements.

DETAILED DESCRIPTION

Figure 1:
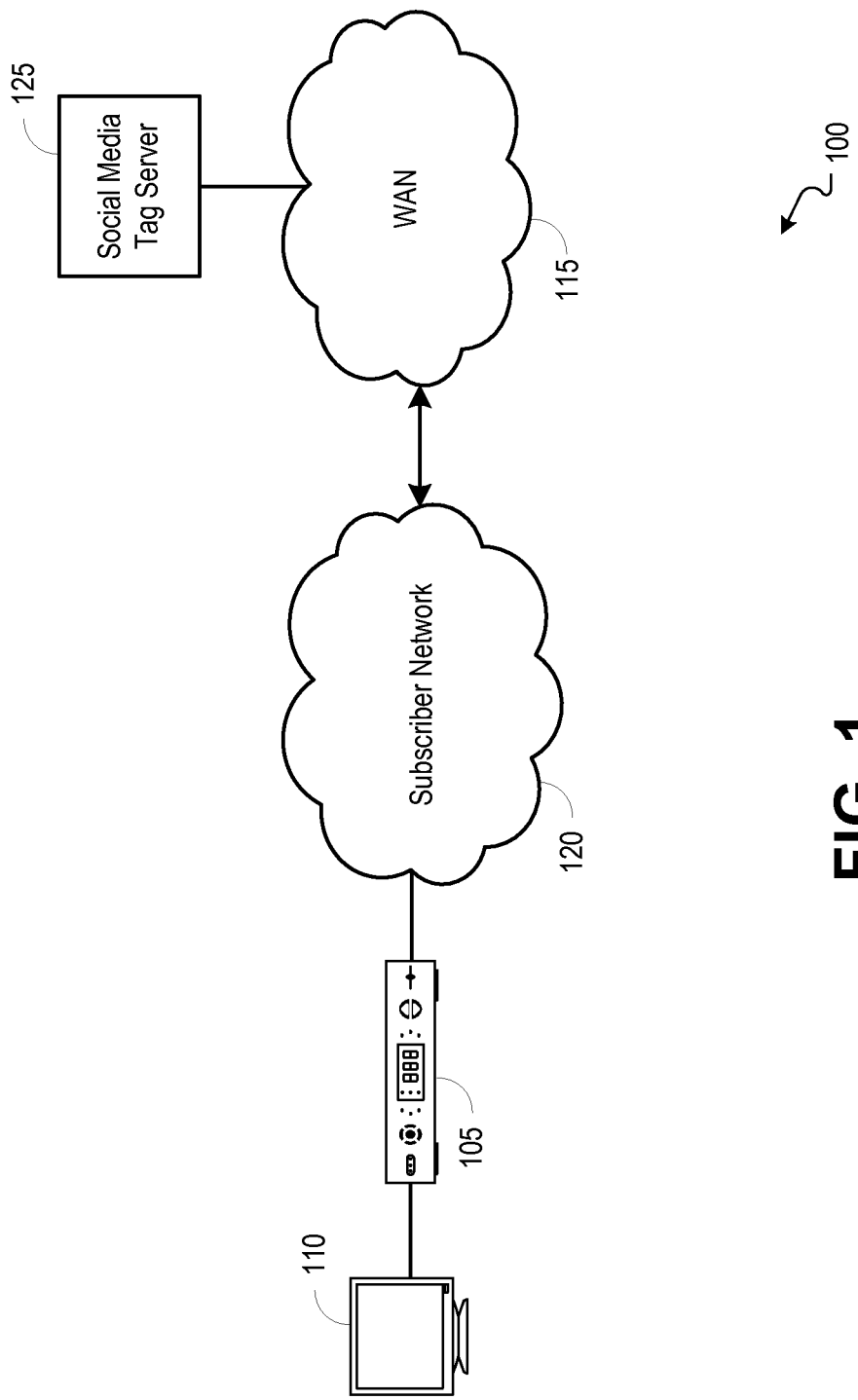
FIG. 1 is a block diagram illustrating an example network environment operable to facilitate the retrieval of a social media tag associated with a content stream.

It is desirable to improve upon methods and systems for retrieving social media tags associated with multimedia content. Methods, systems, and computer readable media can be operable to facilitate the retrieval of a social media tag associated with a content stream. A social media tag associated with a content stream received by a customer premise equipment (CPE) device may be detected and identified, and the social media tag may be presented to a user. The social media tag may be presented to a user along with the underlying multimedia content associated with the content stream, and/or may be delivered to a user device or account. A user interface including the identified social media tag may be presented to a user, and the user may be given the option to receive messages associated with the identified social media tag. Messages associated with the identified social media tag may be updated and presented to the user along with the underlying multimedia content.

An embodiment of the invention described herein may include a method comprising: (a) receiving a content stream and outputting multimedia content associated with the content stream; (b) based on information carried within the content stream, identifying a social media tag associated with the multimedia content; and (c) outputting a notification to a display, wherein the notification comprises the social media tag.

According to an embodiment of the invention, identifying the social media tag associated with the multimedia content comprises performing an optical character recognition on a frame received within the content stream.

According to an embodiment of the invention, the optical character recognition is performed on a pre-defined region of the frame.

According to an embodiment of the invention, identifying the social media tag associated with the multimedia content comprises: (a) detecting a social media tag identifier within closed caption text associated with the received content stream; and (b) identifying the social media tag associated with the social media tag identifier.

According to an embodiment of the invention, identifying the social media tag associated with the multimedia content comprises: (a) retrieving one or more parameters associated with the multimedia content; and (b) identifying the social media tag associated with the multimedia content from a database of social media tags by searching the database using the one or more parameters.

According to an embodiment of the invention, the notification is output to the display as a user interface that is presented over a display of the multimedia content.

According to an embodiment of the invention, the user interface comprises a user-selectable option for following the social media tag.

According to an embodiment of the invention, the notification is output to a messaging account associated with a user.

According to an embodiment of the invention, the method described herein may further comprise: (a) retrieving media associated with the social media tag; and (b) outputting the media to the display.

An embodiment of the invention described herein may include an apparatus comprising: (a) an input interface configured to be used to receive a content stream; (b) a display interface configured to be used to output multimedia content associated with the content stream; (c) a module configured to identify a social media tag associated with the multimedia content; and (d) an output interface configured to be used to output the social media tag to a display.

An embodiment of the invention described herein may include one or more non-transitory computer readable media having instructions operable to cause one or more processors to perform the operations comprising: (a) receiving a content stream and outputting multimedia content associated with the content stream; (b) identifying a social media tag associated with the multimedia content; and (c) outputting the social media tag to a display.

FIG. 1 is a block diagram illustrating an example network environment 100 operable to facilitate the retrieval of a social media tag associated with a content stream. In embodiments, video, voice, and/or data services may be delivered to one or more client devices via one or more customer premise equipment (CPE) devices installed within a subscriber premise. For example, multiple services may be provided by a set-top box (STB) 105 and may be received by a user through a display device (e.g., television 110). It should be understood that a user may receive multiple services through other display devices such as a mobile device, tablet, computer, gaming console, and others. The various data, multimedia, and/or voice services provided by a STB 105 may include, but is not limited to, live or broadcast television, video-on-demand (VoD) content, pay-per view content, recorded content (e.g., DVR content), audio-only content, streaming content, and others.

Multiple services may be delivered to CPE devices over one or more local networks. For example, a local network may be provided by a gateway device, and the multiple services may be delivered to one or more CPE devices by the gateway device. Local network(s) may include a coaxial network, a local area network (LAN), wireless local area network (WLAN), personal area network (PAN), Multimedia over Coax Alliance (MoCA) network, mobile hotspot network, and others. It should be understood that the STB 105 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, and any other network operable to deliver services to a subscriber premise.

In embodiments, multimedia content may be received at a STB 105 as a content stream. The content may be delivered to the STB 105 as a stream of packets or frames, and the packets or frames may be decoded and processed for presentation to a user through a connected display device (e.g., television 110).

In embodiments, the multimedia content received at the STB 105 may be associated with a social media tag (e.g., hashtag or other identifier of a social media topic) that identifies a secondary source of content or information associated with the received multimedia content. For example, the social media tag may identify a sub-section of a social media site that is dedicated to the sharing of information concerning a program received at the STB 105.

In embodiments, a STB 105 may detect and identify a social media tag associated with multimedia content received at the STB 105. For example, an image of a social media tag may be included within one or more frames of the multimedia content, and the STB 105 may detect and identify the social media tag using an optical character recognition (OCR) technique. As another example, an audible or verbal reference may be made to the social media tag within the multimedia content, and the audible or verbal reference may be captured in closed captioning. The STB 105 may search closed caption text associated with the content stream to detect and identify social media tags included within the closed caption text.

Social media tags associated with multimedia content may be extracted from various other sources. For example, social media tags may be retrieved from guide data received at a STB 105 or may be transmitted to the STB 105 as application specific data in MPEG (moving picture experts group) elementary streams (e.g., MPEG user data).

In embodiments, social media tags associated with multimedia content may be detected and identified through a search using one or more parameters associated with the multimedia content. For example, various parameters including, but not limited to, program title, program description, keywords referenced within a program (e.g., names, places, social media tags, etc.), and social media feeds associated with a program (e.g., actor feeds, broadcaster feeds, etc.) may be used to search for one or more social media tags associated with a content stream. The various parameters may be retrieved from within the content stream, electronic program guide data, closed caption text, and other sources.

Detection and identification of social media tags associated with a content stream may be carried out at a STB 105 receiving the content stream or may be carried out by a server located upstream from the STB 105. For example, a social media tag server 125 may detect and identify social media tags associated with one or more content streams delivered from the WAN 115 through the subscriber network 120. Detection and identification of social media tags may be carried out periodically or may be carried out in response to a user request.

In embodiments, one or more identified social media tags associated with a content stream may be presented to a user. For example, when a social media tag is identified, a notification may be output to a user. The notification may be a user interface (e.g., graphical user interface (GUI)) that is output to a display device (e.g., television 110, mobile device, tablet, etc.) through which the user is receiving the associated content stream. The output user interface may provide the user with options for following the identified social media tag, requesting delivery of the identified social media tag to another device, or ignoring the identified social media tag. The notification may be a message that is output to a device associated with the user. For example, the STB 105 may be configured with delivery information associated with one or more user messaging accounts (e.g., short message service (SMS), electronic mail, social media account, etc.), and the STB 105 may output a notification message to one or more of the user messaging accounts. The notification message may include text identifying the one or more social media tags, or may include a hyperlink associated with the social media tag.

In embodiments, where a user selects an option to follow an identified social media tag, the STB 105 may output a user interface that includes social media messages and/or feeds associated with the identified social media tag. For example, the STB 105 may retrieve messages and/or feeds from a social media website using the identified social media tag and may present the retrieved messages and/or feeds in a user interface that is output to a display device (e.g., television 110, mobile device, tablet, etc.). The user interface including the social media messages and/or feeds may be output to the display device until the user requests to close the user interface, until the STB 105 is tuned away from the associated content stream, until the program associated with the social media tag is terminated, or for a predetermined period of time.

Figure 2:
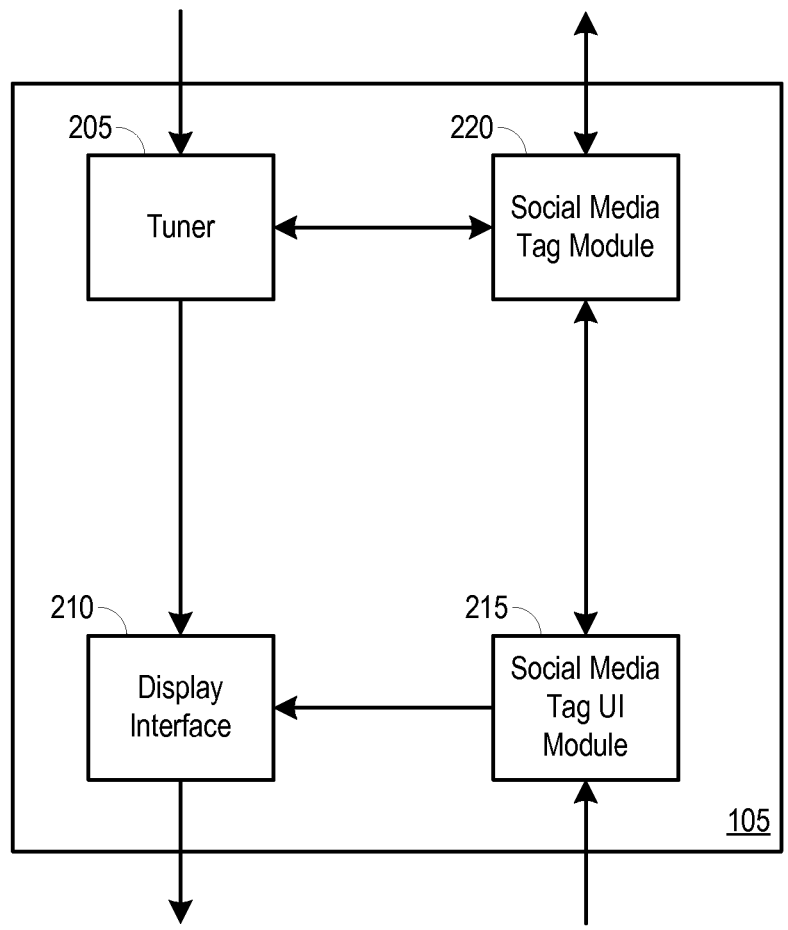
FIG. 2 is a block diagram illustrating an example set-top box (STB) operable to facilitate the retrieval of a social media tag associated with a content stream.

FIG. 2 is a block diagram illustrating an example set-top box (STB) 105 operable to facilitate the retrieval of a social media tag associated with a content stream. The STB 105 may include a tuner 205, a display interface 210, a social media tag user interface (UI) module 215, and a social media tag module 220.

In embodiments, multimedia content may be received at a tuner 205. For example, multimedia content may be received at the tuner 205 from an upstream network (e.g., subscriber network 120 of FIG. 1) as a content stream (e.g., Internet protocol (IP) stream, MPEG stream, etc.). The tuner 205 may decode the received content stream, and process the content for output to a display device (e.g., television 110 of FIG. 1) through the display interface 210.

A search for social media tags associated with a received content stream may be initiated at the STB 105. The search for social media tags may be initiated periodically or conditionally by the STB 105. For example, the STB 105 may be configured to search for social media tags associated with a received program when the tuner 205 is tuned to a new program, or the STB 105 may be configured to conduct a search for social media tags at predetermined intervals. In embodiments, a user may initiate a search for social media tags. For example, the social media tag UI module 215 may receive a command from the user requesting that a search be conducted for social media tags. The user request may be received at the social media tag UI module 215 as a signal received from a remote control unit (RCU) or other interface.

In embodiments, the social media tag module 220 may conduct a search for social media tag(s) associated with a content stream received through the tuner 205. The social media tag module 220 may search individual content stream frames for an image of a social media tag. For example, the social media tag module 220 may search a frame for a social media tag using an OCR technique. Using the OCR technique, images including a social media tag may be detected and identified from a frame. The social media tag module 220 may be configured to search certain regions or sections of a frame for social media tags. For example, social media tags may be more likely to be placed in certain areas of a frame (e.g., corners, bottom, center, etc.), and the social media tag module 220 may limit its search to these pre-defined, higher probability regions of a frame. The social media tag module 220 may divide a frame into a plurality of segments (e.g., the segments of the frame that are most likely to include a social media tag), and an OCR technique may be carried out on the segments separately (e.g., serially or in parallel).

In embodiments, the social media tag module 220 may detect an audible or verbal reference that is made to the social media tag within a received content stream. For example, an audible or verbal reference to a social media tag may be captured in closed caption text associated with a received content stream. The social media tag module 220 may monitor the closed caption text associated with a content stream and may detect a social media tag based on a social media tag identifier that may be found within the closed caption text. For example, a social media tag identifier may be a hashtag symbol (#) or may be certain pre-defined keywords found in the closed caption text (e.g., "hashtag," "social media," etc.).

The social media tag module 220 may retrieve social media tags from various sources. For example, social media tags may be retrieved from guide data received at the STB 105 or social media tags may be received at the STB 105 as application specific data in MPEG elementary streams (e.g., MPEG user data).

In embodiments, the social media tag module 220 may search for social media tags associated with multimedia content using one or more parameters associated with the multimedia content. For example, various parameters including, but not limited to, program title, program description, keywords referenced within a program (e.g., names, places, social media tags, etc.), and social media feeds associated with a program (e.g., actor feeds, broadcaster feeds, etc.) may be used to search for one or more social media tags associated with a content stream. The social media tag module 220 may retrieve the various parameters from within a received content stream, electronic program guide data, closed caption text, and other sources. An external server (e.g., social media tag server 125 of FIG. 1) may store multiple social media tags and associated parameters, and the external server may be searched using the parameters retrieved by the social media tag module 220.

In embodiments, the social media tag module 220 may output the retrieved program parameters to an external server (e.g., upstream server such as social media tag server 125 of FIG. 1), and the external server may search for relevant social media tags using the program parameters. For example, the external server may search the Internet or individual social media sites for social media tags associated with the multimedia content received at the STB 105.

In embodiments, the social media tag module 220 may verify a detected social media tag. The social media tag module 220 may conduct a search for the detected social media tag, and if the social media tag is found, the social media tag module 220 may determine that the social media tag is valid. For example, the social media tag module 220 may output the detected social media tag to an external server (e.g., upstream server such as social media tag server 125 of FIG. 1), and the external server may search for the social media tag via an Internet search or search of social media tag databases associated with one or more social media sites. The external server may determine whether the social media tag exists and whether the social media tag is relevant to the multimedia content received at the STB 105 based on the results of the search.

When a social media tag is detected and identified by the social media tag module 220, the social media tag may be presented to a user. In embodiments, the social media tag UI module 215 may present the social media tag to a user by outputting a notification or message to a user. For example, the social media tag UI module 215 may output a user interface (e.g., GUI) through the display interface 210 to a display device (e.g., television 110 of FIG. 1). The user interface may be displayed in front of (i.e., on top of) associated multimedia content that is displayed to a user, and the user interface may include the identified social media tag(s) and one or more user-selectable options for dealing with the social media tag(s) (e.g., options for following the social media tag(s), closing the user interface and ignoring the social media tag(s), requesting delivery of the social media tag(s) to another user device, etc.). As another example, the notification or message may be output to a device (e.g., mobile device, tablet, computer, etc.) associated with the user. For example, the social media tag UI module 215 may be configured with delivery information associated with one or more user messaging accounts (e.g., short message service (SMS), electronic mail, social media, etc.), and a notification message may be output through the social media tag module 220 to one or more of the user messaging accounts. The notification message may include text identifying the one or more social media tags, or may include a hyperlink associated with the social media tag.

In embodiments, the social media tag UI module 215 may retrieve messages and/or feeds associated with an identified social media tag and may generate a user interface including the messages and/or feeds. The social media tag UI module 215 may retrieve the messages and/or feeds from an upstream server via the social media tag module 220. For example, the social media tag module 220 may retrieve messages and/or feeds from a social media website using an identified social media tag. The user interface may be output from the social media tag UI module 215 to a display device (e.g., television 110 of FIG. 1) through the display interface 210. The user interface may be displayed over the top of associated multimedia content or may be displayed within expanded margins along one or more edges of the displayed multimedia content. For example, the user interface may be displayed at one or more side margins and/or a top or bottom margin of a display area (e.g., display area of a display device screen) or may be displayed as a running ticker along the top or bottom edge of the display area.

In embodiments, social media messages and/or feeds may be updated within the user interface as media messages and/or feeds are updated at a corresponding social media website, and the user interface may be presented at the display device until a termination event occurs (e.g., the user requests to close the user interface, the tuner 205 is tuned away from the associated content stream, the program associated with the social media tag is terminated, or after a predetermined period of time). For example, the social media tag UI module 215 may continue to retrieve social media messages and/or feeds associated with the identified social media tag(s) until a termination event occurs.

Figure 3:
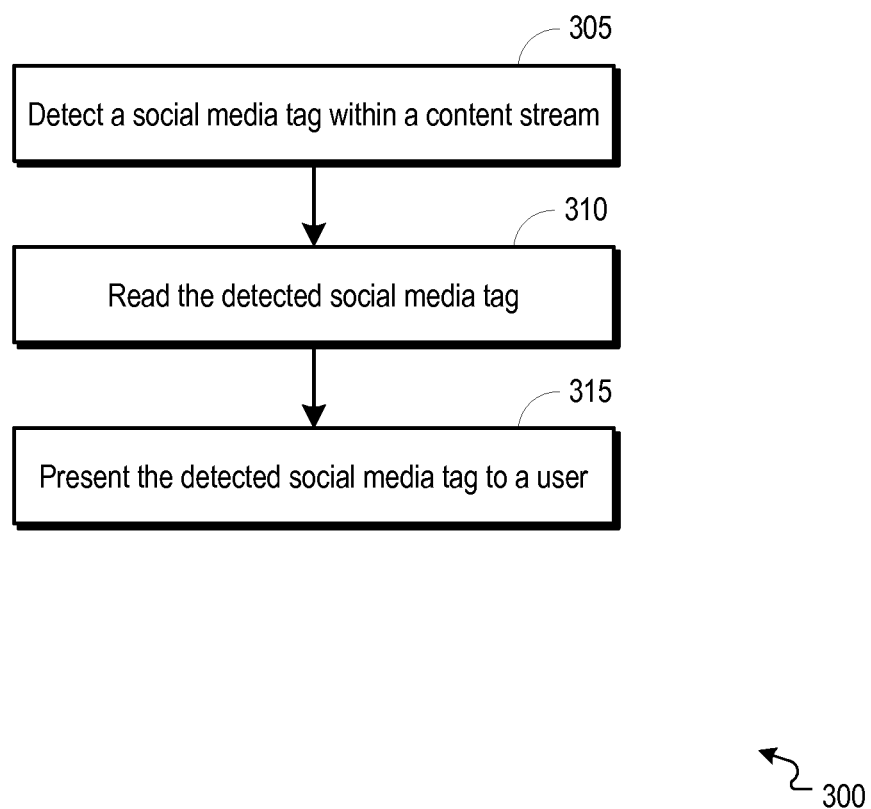
FIG. 3 is a flowchart illustrating an example process operable to facilitate the retrieval of a social media tag associated with a content stream.

FIG. 3 is a flowchart illustrating an example process 300 operable to facilitate the retrieval of a social media tag associated with a content stream. The process 300 can begin at 305, when a social media tag is detected within a content stream. The social media tag may be detected, for example, by a STB 105 of FIG. 1 (e.g., at a social media tag module 220 of FIG. 2) that is receiving the content stream. In embodiments, the social media tag may be detected by applying an OCR technique to a frame or still image of the content stream, by searching closed caption text, by using one or more parameters associated with the content stream to search for social media tags, or by receiving the social media tag from another source (e.g., electronic program guide (EPG) data, MPEG elementary stream, etc.). A social media tag may be detected based upon an identification of a social media tag identifier. A social media tag identifier may be a hashtag symbol (#) or a reference to a social media service (e.g., "hashtag"). It should be understood that the social media tag may be detected by a server upstream from a STB 105 (e.g., social media tag server 125 of FIG. 1).

At 310, the detected social media tag may be read. The social media tag may be read, for example, by the STB 105 (e.g., social media tag module 220). In embodiments, the social media tag may be read via an OCR technique or an identification of text received at the STB 105 (e.g., closed caption text, search results, EPG data, MPEG elementary streams, etc.).

At 315, the detected social media tag may be presented to a user. In embodiments, a user interface (e.g., GUI) may be generated, for example, by the STB 105 (e.g., at a social media tag UI module 215 of FIG. 2), and the user interface may be output from the STB 105 to a display device (e.g., television 110 of FIG. 1, mobile device, tablet, etc.). The user interface may be displayed along with associated multimedia content and may include an identification of the detected social media tag. The user interface may also include one or more user-selectable options for dealing with the detected social media tag (e.g., follow the social media tag, ignore the social media tag, send the social media tag to another device, etc.). In embodiments, the detected social media tag may be presented to a user as a notification that includes an identification of the social media tag. The notification may be output to an associated display device or may be output to a pre-configured user messaging account (e.g., SMS, electronic mail address, social media account, etc.).

Figure 4:
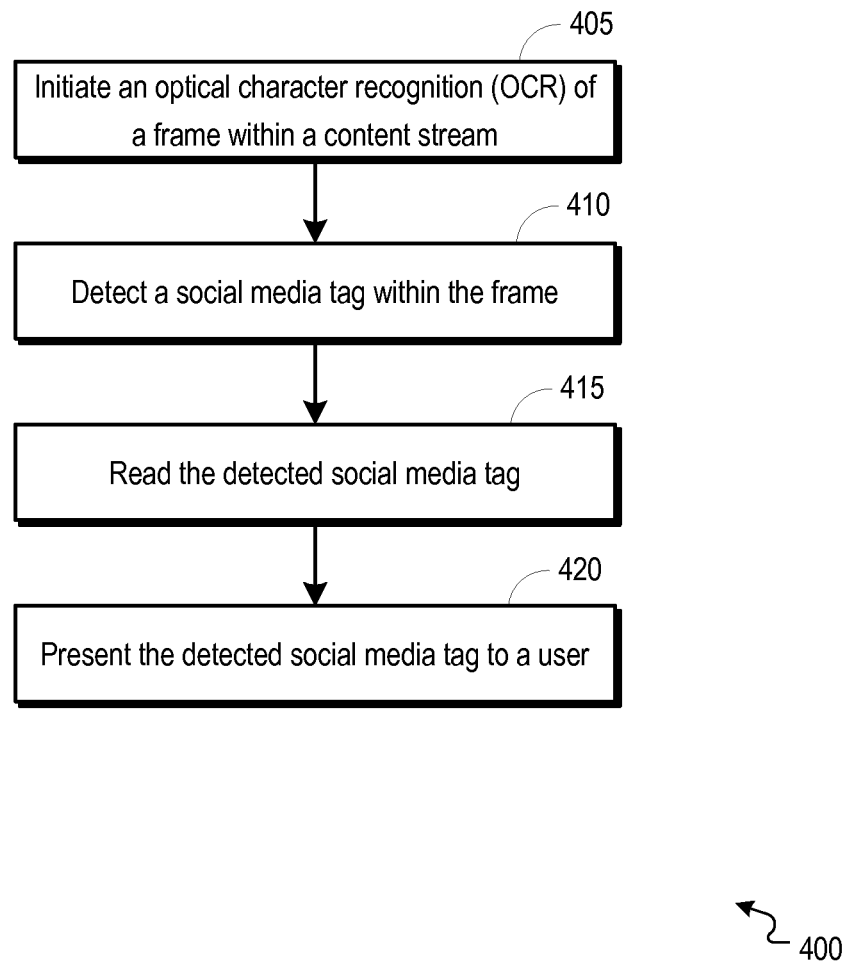
FIG. 4 is a flowchart illustrating an example process operable to facilitate the detection of a social media tag image carried by a frame of a content stream.

FIG. 4 is a flowchart illustrating an example process 400 operable to facilitate the detection of a social media tag image carried by a frame of a content stream. The process 400 can begin at 405, when an optical character recognition (OCR) is initiated and applied to a frame of a content stream. The OCR of a frame may be initiated periodically (e.g., at predetermined intervals) or may be initiated by a user request received at a STB 105 of FIG. 1 to search for social media tags associated with a content stream.

The OCR technique may be applied to a frame, for example, by a social media tag module 220 of FIG. 2. In embodiments, the social media tag module 220 may be configured to search certain regions or sections of a frame for social media tags. For example, the social media tag module 220 may limit its search to pre-defined, higher probability regions of a frame (e.g., corners, bottom, center, etc.). The social media tag module 220 may divide a frame into a plurality of segments (e.g., the segments of the frame that are most likely to include a social media tag), and an OCR technique may be carried out on the segments separately (e.g., serially or in parallel).

At 410, a social media tag may be detected within the frame. The social media tag may be detected, for example, by a STB 105 of FIG. 1 (e.g., at a social media tag module 220 of FIG. 2) that is receiving the content stream. In embodiments, the social media tag may be detected by identifying the text of a social media tag that is translated from an image of the frame during the application of the OCR technique to the frame. A social media tag may be detected based upon an identification of a social media tag identifier. A social media tag identifier may be a hashtag symbol (#) or a reference to a social media service (e.g., "hashtag"). It should be understood that the social media tag may be detected by a server upstream from a STB 105 (e.g., social media tag server 125 of FIG. 1).

At 415, the detected social media tag may be read. The social media tag may be read, for example, by the STB 105 (e.g., social media tag module 220). In embodiments, the social media tag may be read from translated text extracted from an image of the frame via the OCR technique.

At 420, the detected social media tag may be presented to a user. In embodiments, a user interface (e.g., GUI) may be generated, for example, by the STB 105 (e.g., at a social media tag UI module 215 of FIG. 2), and the user interface may be output from the STB 105 to a display device (e.g., television 110 of FIG. 1, mobile device, tablet, etc.). The user interface may be displayed along with associated multimedia content and may include an identification of the detected social media tag. The user interface may also include one or more user-selectable options for dealing with the detected social media tag (e.g., follow the social media tag, ignore the social media tag, send the social media tag to another device, etc.). In embodiments, the detected social media tag may be presented to a user as a notification that includes an identification of the social media tag. The notification may be output to an associated display device or may be output to a pre-configured user messaging account (e.g., SMS, electronic mail address, social media account, etc.).

Figure 5:
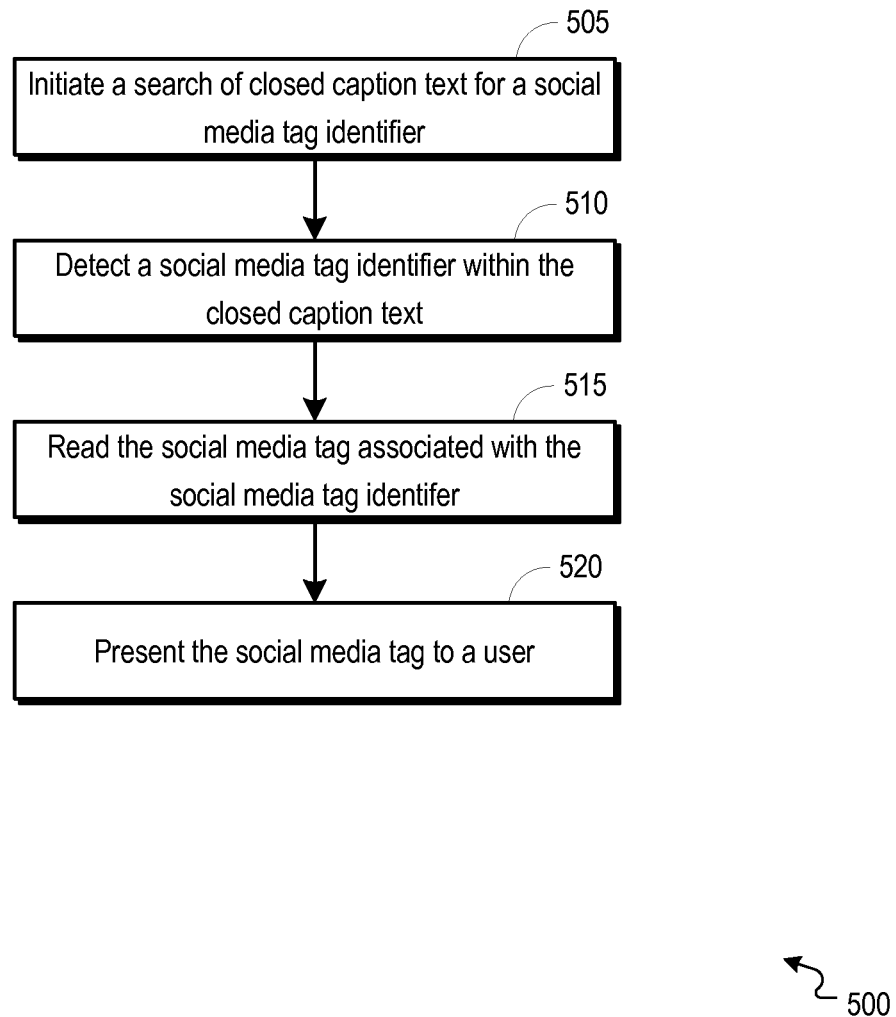
FIG. 5 is a flowchart illustrating an example process operable to facilitate the detection of a social media tag from closed caption text.

FIG. 5 is a flowchart illustrating an example process 500 operable to facilitate the detection of a social media tag from closed caption text. The process 500 can begin at 505, when a search of closed caption text for a social media tag identifier is initiated. The search for a social media tag identifier may be initiated periodically (e.g., at predetermined intervals), or may be initiated by a user request received at a STB 105 of FIG. 1 to search for social media tags associated with a content stream. In embodiments, a STB 105 may be configured to search all closed caption text received at the STB 105 for social media tag identifiers. As an example, a social media tag module 220 of FIG. 2 may search closed caption text received at the STB 105 for social media tag identifiers.

At 510, a social media tag identifier may be detected within closed caption text. The social media tag identifier may be detected, for example, by a STB 105 (e.g., at a social media tag module 220) that is receiving a content stream associated with the closed caption text. In embodiments, a social media tag identifier may be a hashtag symbol (#) or a reference to a social media service (e.g., "hashtag"). It should be understood that the social media tag may be detected by a server upstream from a STB 105 (e.g., social media tag server 125 of FIG. 1).

At 515, the social media tag associated with the detected social media tag identifier may be read. The social media tag may be read, for example, by the STB 105 (e.g., social media tag module 220). In embodiments, text including and text immediately following the detected social media tag identifier may be read and extracted from the closed caption text. For example, the social media tag module 220 may detect a "#" symbol in closed caption text, and the text immediately following the "#" symbol may be "program," thus the social media tag module 220 may read the social media tag as "#program."

At 520, the social media tag may be presented to a user. In embodiments, a user interface (e.g., GUI) may be generated, for example, by the STB 105 (e.g., at a social media tag UI module 215 of FIG. 2), and the user interface may be output from the STB 105 to a display device (e.g., television 110 of FIG. 1, mobile device, tablet, etc.). The user interface may be displayed along with associated multimedia content and may include an identification of the social media tag. The user interface may also include one or more user-selectable options for dealing with the social media tag (e.g., follow the social media tag, ignore the social media tag, send the social media tag to another device, etc.). In embodiments, the social media tag may be presented to a user as a notification that includes an identification of the social media tag. The notification may be output to an associated display device or may be output to a pre-configured user messaging account (e.g., SMS, electronic mail address, social media account, etc.).

Figure 6:
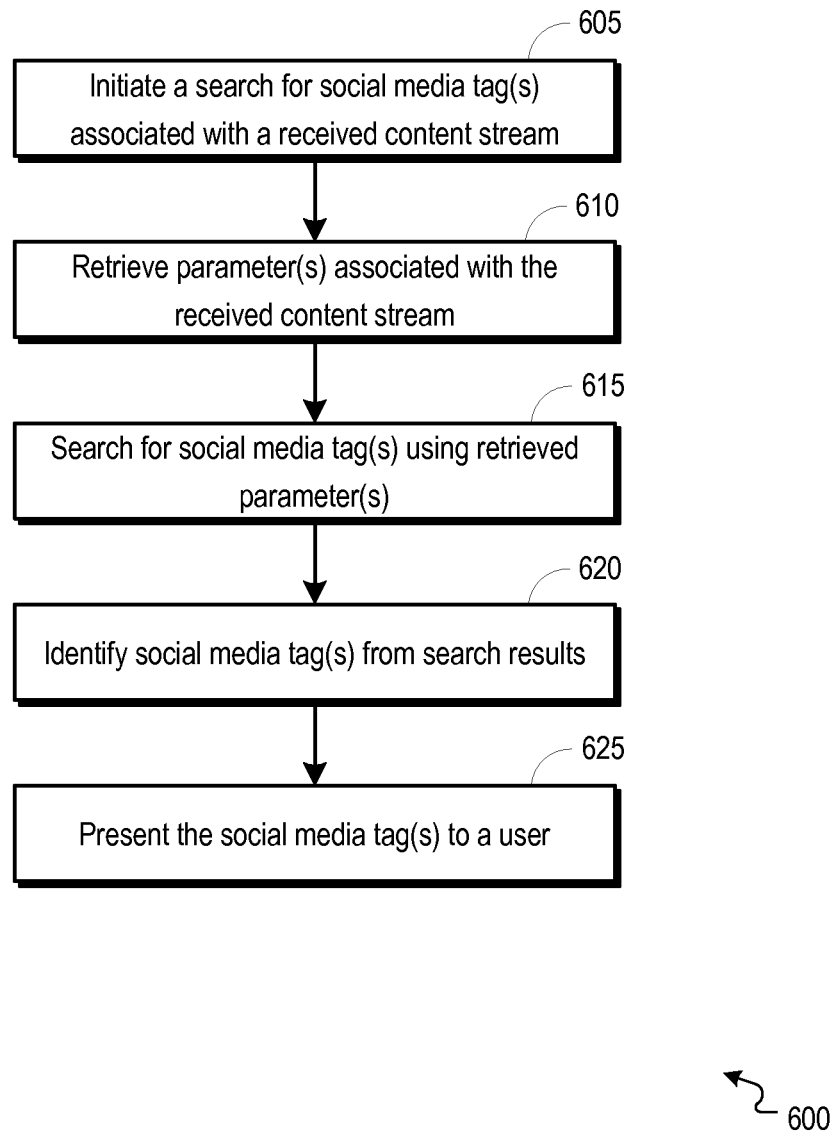
FIG. 6 is a flowchart illustrating an example process operable to facilitate a search for social media tags associated with a program based on one or more parameters associated with the program.

FIG. 6 is a flowchart illustrating an example process 600 operable to facilitate a search for social media tags associated with a program based on one or more parameters associated with the program. The process 600 can begin at 605, when a search for social media tags associated with a received content stream is initiated. The search for social media tags may be initiated periodically (e.g., at predetermined intervals), or may be initiated by a user request received at a STB 105 of FIG. 1 to search for social media tags associated with a content stream.

At 610, parameters associated with the content stream may be retrieved. Parameters may be retrieved, for example, by the STB 105 (e.g., by a social media tag module 220 of FIG. 2). In embodiments, the parameters may be associated with a program carried by the content stream, and the parameters may include, but are not limited to, program title, program description, keywords referenced within a program (e.g., names, places, social media tags, etc.), and social media feeds associated with a program (e.g., actor feeds, broadcaster feeds, etc.). The various parameters may be retrieved from within the content stream, electronic program guide data, closed caption text, and other sources.

At 615, a search for social media tags may be conducted using the retrieved parameters. In embodiments, a database of social media tags may be searched to identify one or more social media tags matching one or more of the identified parameters associated with the content stream that is received at the STB 105. The database may be stored at an internal location of the STB 105 or may be located at a server upstream from the STB 105 (e.g., social media tag server 125 of FIG. 1). The identified parameters may be used to narrow down a list of social media tags that may be associated with the content stream.

At 620, one or more social media tags may be identified from search results obtained from the search using the identified parameters. The search results may be obtained by the STB 105 from a module internal to the STB 105 or may be obtained by the STB 105 from an upstream server (e.g., social media tag server 125). One or more social media tags may be identified, for example, by the social media tag module 220 of FIG. 2. In embodiments, the social media tag module 220 may identify one or more social media tags as relevant to a program based upon the identified parameters associated with the program.

At 625, the social media tag(s) may be presented to a user. In embodiments, a user interface (e.g., GUI) may be generated, for example, by the STB 105 (e.g., at a social media tag UI module 215 of FIG. 2), and the user interface may be output from the STB 105 to a display device (e.g., television 110 of FIG. 1, mobile device, tablet, etc.). The user interface may be displayed along with associated multimedia content and may include an identification of the social media tag(s). The user interface may also include one or more user-selectable options for dealing with the social media tag(s) (e.g., follow the social media tag, ignore the social media tag, send the social media tag to another device, etc.). In embodiments, the social media tag(s) may be presented to a user as a notification that includes an identification of the social media tag(s). The notification may be output to an associated display device or may be output to a pre-configured user messaging account (e.g., SMS, electronic mail address, social media account, etc.).

Figure 7:
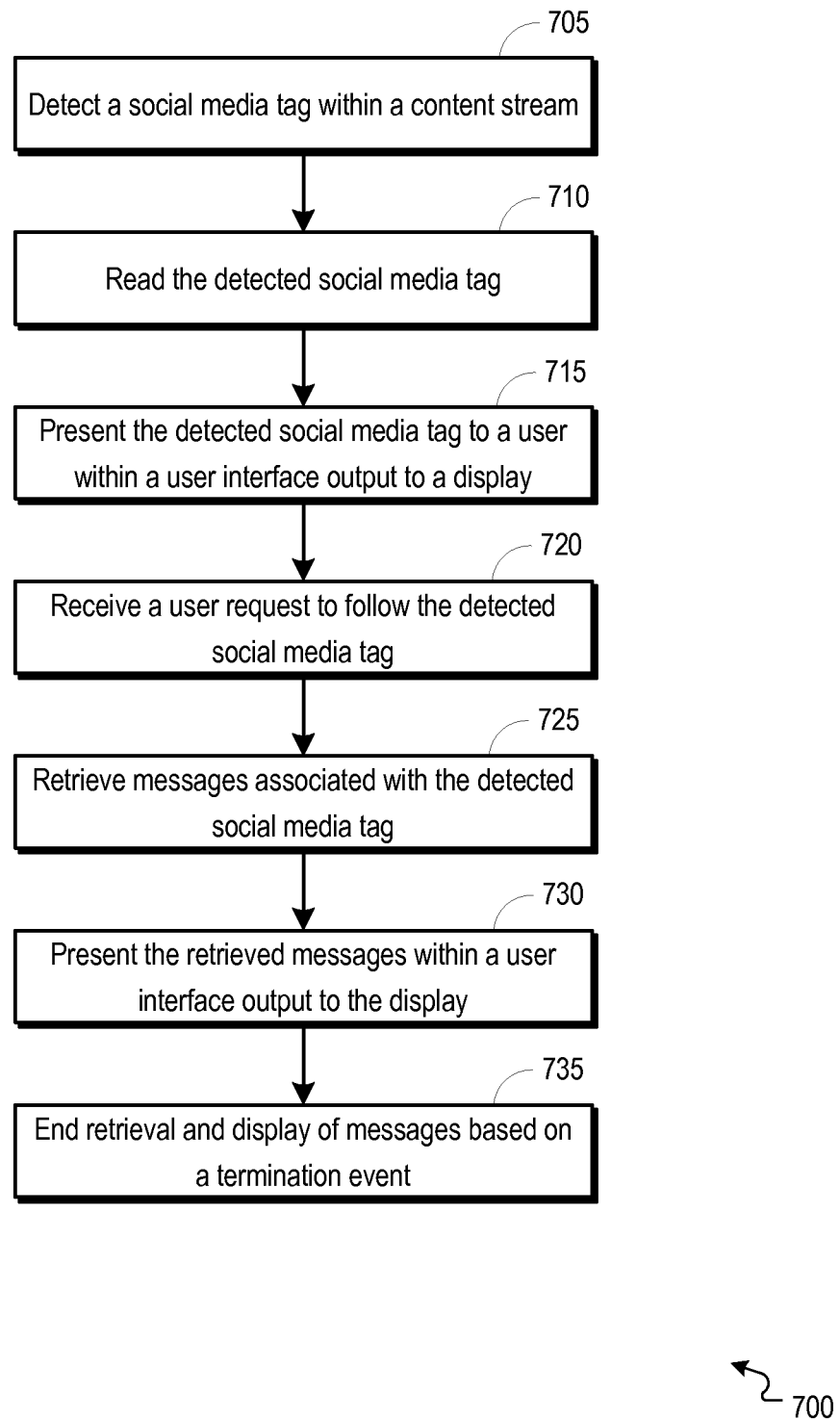
FIG. 7 is a flowchart illustrating an example process operable to facilitate the retrieval of social media messages associated with a content stream.

FIG. 7 is a flowchart illustrating an example process 700 operable to facilitate the retrieval of social media messages associated with a content stream. The process 700 can begin at 705, when a social media tag is detected within a content stream. The social media tag may be detected, for example, by a STB 105 of FIG. 1 (e.g., at a social media tag module 220 of FIG. 2) that is receiving the content stream. In embodiments, the social media tag may be detected by applying an OCR technique to a frame or still image of the content stream, by searching closed caption text, by using one or more parameters associated with the content stream to search for social media tags, or by receiving the social media tag from another source (e.g., electronic program guide (EPG) data, MPEG elementary stream, etc.). A social media tag may be detected based upon an identification of a social media tag identifier. A social media tag identifier may be a hashtag symbol (#) or a reference to a social media service (e.g., "hashtag"). It should be understood that the social media tag may be detected by a server upstream from a STB 105 (e.g., social media tag server 125 of FIG. 1).

At 710, the detected social media tag may be read. The social media tag may be read, for example, by the STB 105 (e.g., social media tag module 220). In embodiments, the social media tag may be read via an OCR technique or an identification of text received at the STB 105 (e.g., closed caption text, search results, EPG data, MPEG elementary streams, etc.).

At 715, the detected social media tag may be presented to a user. In embodiments, a user interface (e.g., GUI) may be generated, for example, by the STB 105 (e.g., at a social media tag UI module 215 of FIG. 2), and the user interface may be output from the STB 105 to a display device (e.g., television 110 of FIG. 1, mobile device, tablet, etc.). The user interface may be displayed along with associated multimedia content and may include an identification of the detected social media tag. The user interface may also include one or more user-selectable options for dealing with the detected social media tag (e.g., follow the social media tag, ignore the social media tag, send the social media tag to another device, etc.).

At 720, a user request to follow the detected social media tag may be received. The user request may be received, for example, by the STB 105 (e.g., at the social media tag UI module 215). In embodiments, the user may select an option presented within the displayed user interface, the option indicating the user's intent to follow the detected social media tag. The user request may be received at the social media tag UI module 215 as a signal transmitted from a remote control unit (RCU).

At 725, messages associated with the detected social media tag may be retrieved. Messages may be retrieved, for example, by the social media tag module 220 or social media tag UI module 215. The social media tag UI module 215 may retrieve the messages and/or feeds from an upstream server via the social media tag module 220. For example, the social media tag module 220 may retrieve messages and/or feeds from a social media website using an identified social media tag.

At 730, the retrieved messages may be presented within a user interface that is output to a display. The user interface may be output from the social media tag UI module 215 to a display device (e.g., television 110 of FIG. 1). In embodiments, the user interface may be displayed over the top of associated multimedia content or may be displayed within expanded margins along one or more edges of the displayed multimedia content. For example, the user interface may be displayed at one or more side margins and/or a top or bottom margin of a display area (e.g., display area of a display device screen) or may be displayed as a running ticker along the top or bottom edge of the display area.

At 735, retrieval and display of messages may be terminated based on the occurrence of a termination event. In embodiments, social media messages and/or feeds may be updated within the user interface as media messages and/or feeds are updated at a corresponding social media website, and the user interface may be presented at the display device until a user requests to close the user interface, until the STB 105 is tuned away from the associated content stream, until the program associated with the social media tag is terminated, or for a predetermined period of time.

Figure 8:
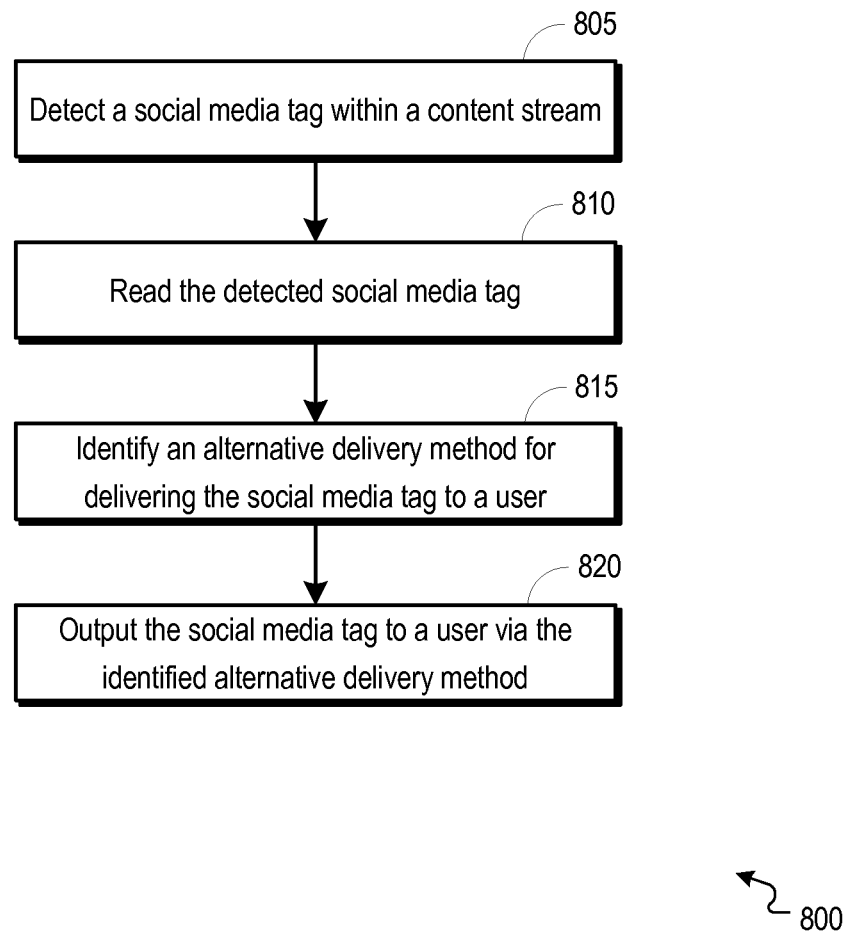
FIG. 8 is a flowchart illustrating an example process operable to facilitate the detection of a social media tag associated with a content stream and the delivery of the social media tag to a device associated with a user.

FIG. 8 is a flowchart illustrating an example process 800 operable to facilitate the detection of a social media tag associated with a content stream and the delivery of the social media tag to a device associated with a user. The process 800 can begin at 805, when a social media tag is detected within a content stream. The social media tag may be detected, for example, by a STB 105 of FIG. 1 (e.g., at a social media tag module 220 of FIG. 2) that is receiving the content stream. In embodiments, the social media tag may be detected by applying an OCR technique to a frame or still image of the content stream, by searching closed caption text, by using one or more parameters associated with the content stream to search for social media tags, or by receiving the social media tag from another source (e.g., electronic program guide (EPG) data, MPEG elementary stream, etc.). A social media tag may be detected based upon an identification of a social media tag identifier. A social media tag identifier may be a hashtag symbol (#) or a reference to a social media service (e.g., "hashtag"). It should be understood that the social media tag may be detected by a server upstream from a STB 105 (e.g., social media tag server 125 of FIG. 1).

At 810, the detected social media tag may be read. The social media tag may be read, for example, by the STB 105 (e.g., social media tag module 220). In embodiments, the social media tag may be read via an OCR technique or an identification of text received at the STB 105 (e.g., closed caption text, search results, EPG data, MPEG elementary streams, etc.).

At 815, an alternative delivery method may be identified. An alternative delivery method may be identified, for example, by the STB 105 (e.g., at the social media tag module 220). In embodiments, the social media tag module 220 may be configured to identify one or more devices or user accounts to which identified social media tags are to be delivered. For example, the STB 105 may be configured with delivery information associated with one or more user messaging accounts (e.g., short message service (SMS), electronic mail, social media accounts, etc.).

At 820, the social media tag may be output to a user via the identified alternative delivery method. The social media tag may be output, for example, by the STB 105 (e.g., by the social media tag UI module 215 or social media tag module 220). In embodiments, the STB 105 may output a notification message to one or more of the identified user devices or user messaging accounts. The notification message may include text identifying the detected social media tag, and may include a hyperlink associated with the social media tag.

Figure 9:
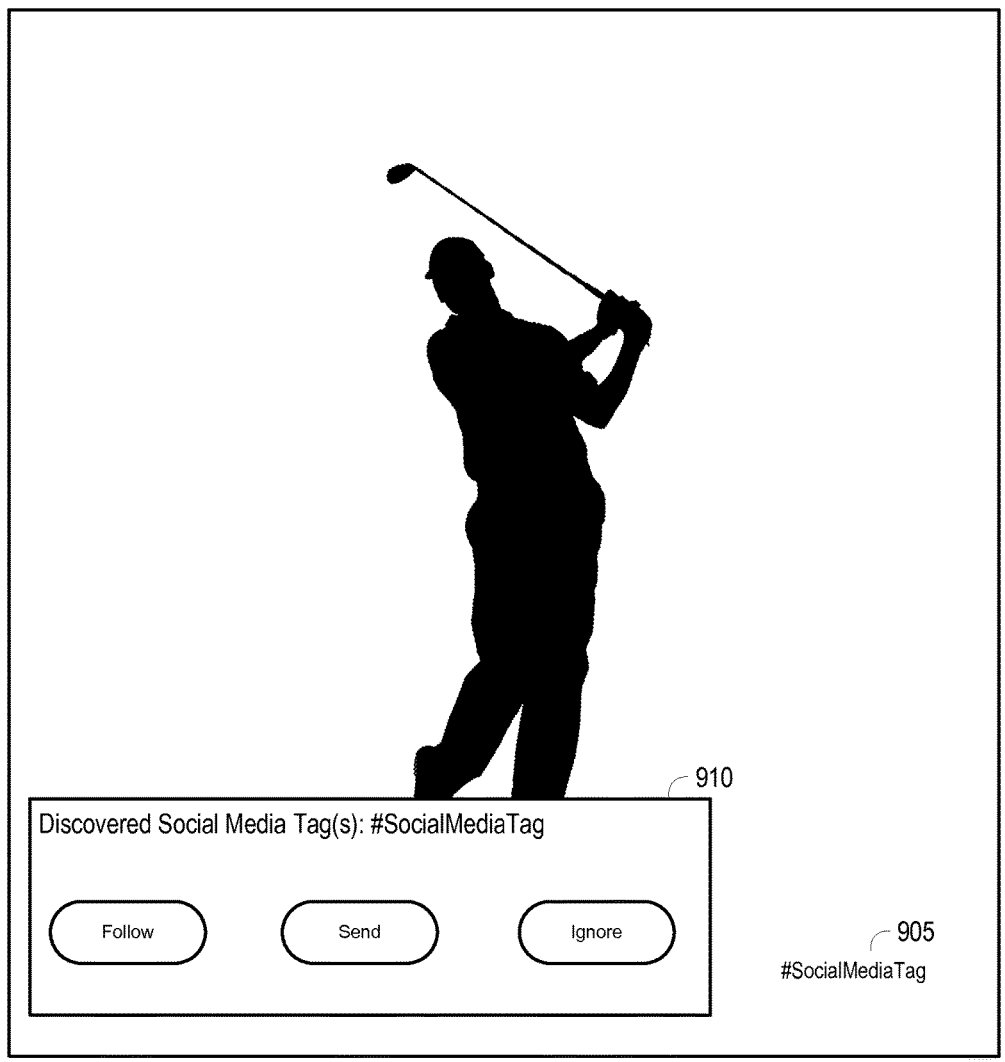
FIG. 9 is an example illustration of a display including an identification of a social media tag associated with a received content stream.

FIG. 9 is an example illustration of a display 900 including an identification of a social media tag associated with a received content stream. The display 900 may be output from a STB 105 of FIG. 1 to a display device 110 and may include multimedia content associated with the content stream received at the STB 105. In embodiments, a social media tag 905 associated with the content stream may be detected by the STB 105. For example, the social media tag 905 may be included within the content stream as an image that is presented to a user within the associated multimedia content.

In embodiments, when the social media tag 905 is detected by the STB 105, the STB 105 may output a user interface 910 to the user. The user interface 910 may be output from the STB 105 to the display device that is currently displaying the associated multimedia content, and the user interface may be presented on top of the associated multimedia content.

The user interface 910 may include an identification of the detected social media tag 905, and may include one or more options for interacting with the social media tag 905. For example, the user interface 910 may include user-selectable options for following the detected social media tag 905, sending the social media tag 905 to another device or account, ignoring the social media tag 905, and others. A user may control and interact with the user interface 910 via a control unit (e.g., RCU) or control application (e.g., touchscreen or voice interface) associated with the STB 105 or connected display device 110.

Figure 10:
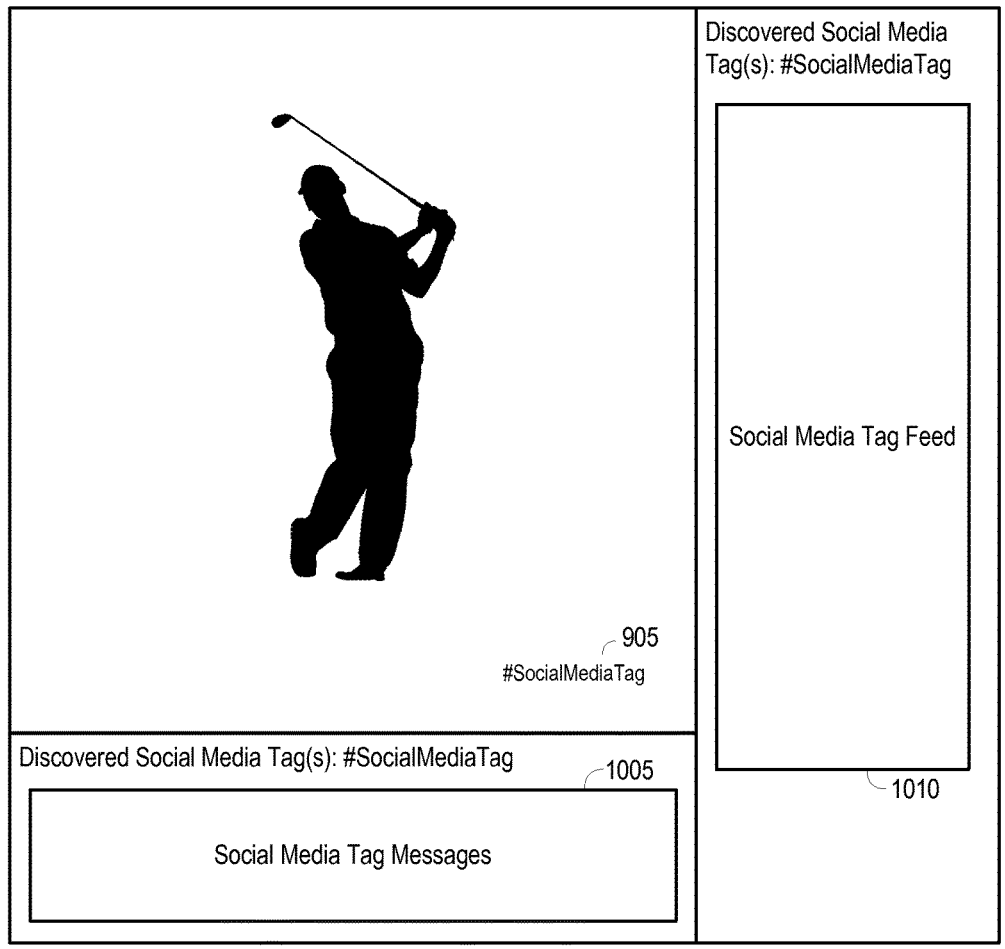
FIG. 10 is an example illustration of a display including media associated with a social media tag.

FIG. 10 is an example illustration of a display 900 including media associated with a social media tag. In embodiments, when a social media tag 905 is detected and the determination is made to follow the detected social media tag 905, media associated with the social media tag 905 may be displayed along with the underlying multimedia content. For example, one or more social media tag messages 1005 and/or one or more social media tag feeds 1010 may be displayed to a user. The social media tag messages 1005 and social media tag feeds 1010 may include messages and/or feeds that are recovered from a social media site and account identified by the social media tag 905. In embodiments, the displayed social media tag messages 1005 and/or social media tag feeds 1010 may be updated within the display 900 as they are updated at the corresponding social media site. It should be understood that the display of the underlying multimedia content may be reformatted or otherwise scaled down to make room for the display of the social media tag messages 1005 and/or social media tag feeds 1010.

Figure 11:
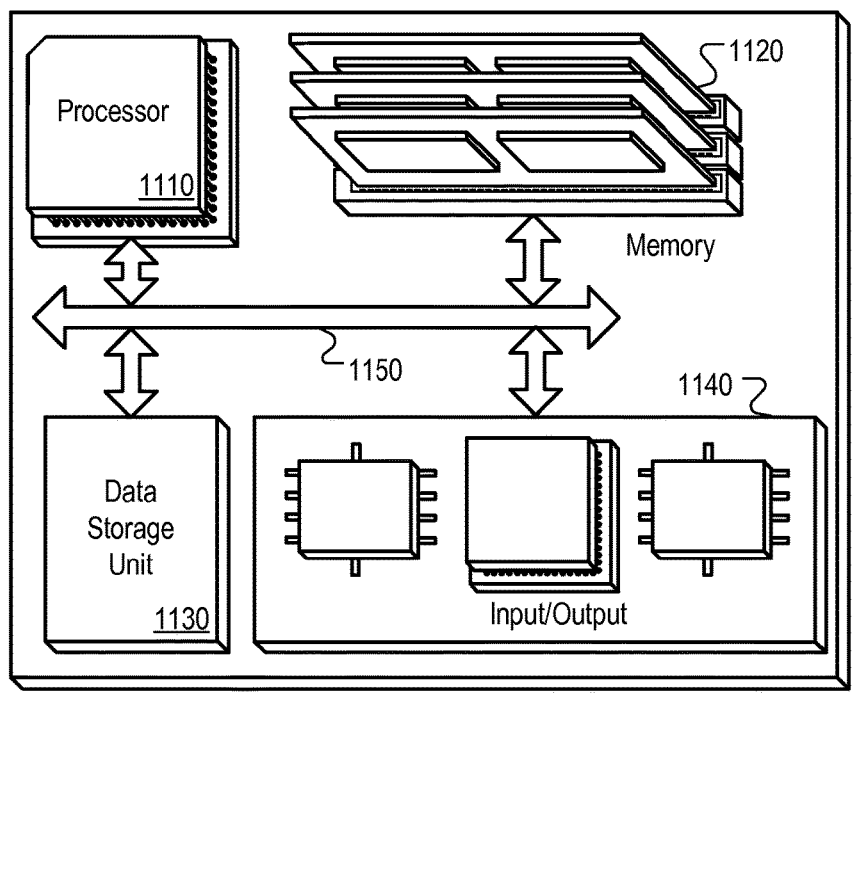
FIG. 11 is a block diagram of a hardware configuration operable to facilitate the retrieval of a social media tag associated with a content stream.

FIG. 11 is a block diagram of a hardware configuration 1100 operable to facilitate the retrieval of a social media tag associated with a content stream. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., display device 110 of FIG. 1, television, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, etc.).

Those skilled in the art will appreciate that the invention improves upon methods and systems for identifying social media tags associated with multimedia content. Methods, systems, and computer readable media can be operable to facilitate the retrieval of a social media tag associated with a content stream. A social media tag associated with a content stream received by a customer premise equipment (CPE) device may be detected and identified, and the social media tag may be presented to a user. The social media tag may be presented to a user along with the underlying multimedia content associated with the content stream, and/or may be delivered to a user device or account. A user interface including the identified social media tag may be presented to a user, and the user may be given the option to receive messages associated with the identified social media tag. Messages associated with the identified social media tag may be updated and presented to the user along with the underlying multimedia content.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:
1. A method comprising:
receiving, at a media device, a content stream and outputting multimedia content associated with the content stream, wherein the content stream comprises at least one frame comprising an image of a social media tag, and wherein the content stream is received over a channel to which the media device is tuned;
detecting the image of the social media tag;
identifying the social media tag from the image of the social media tag using an optical character recognition technique;
retrieving one or more parameters associated with the multimedia content, wherein the one or more parameters associated with the multimedia content are retrieved from the content stream, and wherein the one or more parameters associated with the multimedia content comprise one or more content identifiers;
based on the retrieved one or more parameters associated with the multimedia content, identifying one or more social media tags associated with the multimedia content, wherein identifying the one or more social media tags associated with the multimedia content comprises:
initiating a search for one or more social media tags associated with the multimedia content; and
identifying one or more social media tags associated with the multimedia content from a database of social media tags, wherein the database comprises an association between each of the social media tags and one or more content parameters, and wherein the one or more social media tags associated with the multimedia content comprise one or more social media tags that are associated with one or more content parameters matching at least one of the one or more parameters associated with the multimedia content; and
outputting a notification to a display, wherein the notification comprises an identification of the social media tag identified from the image of the social media tag and an identification of the one or more social media tags associated with the one or more parameters associated with the multimedia content, and wherein the notification comprises a user-selectable option for following one or more of the social media tags identified within the notification;

receiving a user selection of the option to follow one or more of the social media tags identified within the notification;

retrieving media associated with the one or more social media tags; and outputting the media associated with the one or more social media tags to the display until the media device is tuned away from the channel.

2. The method of claim 1, wherein the optical character recognition is performed on a pre-defined region of the frame.

3. The method of claim 1, wherein identifying the one or more social media tags associated with the multimedia content comprises:

detecting a social media tag identifier within closed caption text associated with the received content stream; and identifying the social media tag associated with the social media tag identifier.

4. The method of claim 1, wherein the notification is output to the display as a user interface that is presented over a display of the multimedia content.

5. The method of claim 1, wherein the notification is output to a messaging account associated with a user.

6. An apparatus comprising:

an input interface configured to be used to receive a content stream, wherein the content stream comprises at least one frame comprising an image of a social media tag, and wherein the content stream is received over a channel to which the input interface is tuned;

a display interface configured to be used to output multimedia content associated with the content stream;

a module configured to:

detect the image of the social media tag;

identify the social media tag from the image of the social media tag using an optical character recognition technique;

identify a social media tag associated with the multimedia content, wherein identifying the social media tag associated with the multimedia content comprises:

retrieving one or more parameters associated with the multimedia content, wherein the one or more parameters associated with the multimedia content are retrieved from the content stream, and wherein the one or more parameters associated with the multimedia content comprise one or more content identifiers;

initiating a search for a social media tag associated with the multimedia content; and identifying the social media tag associated with the multimedia content from a database of social media tags, wherein the database comprises an association between each of the social media tags and one or more content parameters, and wherein the social media tag associated with the multimedia content comprises a social media tag that is associated with one or more content parameters matching at least one of the one or more parameters associated with the multimedia content; and an output interface configured to be used to output a notification to a display, wherein the notification comprises an identification of the social media tag identified from the image of the social media tag and an identification of the social media tag associated with the one or more parameters associated with the multimedia content, and wherein the notification comprises a user-selectable option for following one or more of the social media tags identified within the notification;

wherein the module is further configured to receive a user selection of the option to follow one or more of the social media tags identified within the notification and retrieve media associated with the one or more social media tags; and wherein the display interface is further configured to be used to output the media associated with the one or more social media tags to the display until the input interface is tuned away from the channel.

7. The apparatus of claim 6, wherein the module is configured to identify the social media tag associated with the multimedia content by detecting a social media tag identifier within closed caption text associated with the received content stream and identifying the social media tag associated with the social media tag identifier.

8. One or more non-transitory computer readable media having instructions operable to cause one or more processors to perform the operations comprising:

receiving, at a media device, a content stream and outputting multimedia content associated with the content stream, wherein the content stream comprises at least one frame comprising an image of a social media tag, and wherein the content stream is received over a channel to which the media device is tuned;

detecting the image of the social media tag;

identifying the social media tag from the image of the social media tag using an optical character recognition technique;

identifying a social media tag associated with the multimedia content, wherein identifying the social media tag associated with the multimedia content comprises:

retrieving one or more parameters associated with the multimedia content, wherein the one or more parameters associated with the multimedia content are retrieved from the content stream, and wherein the one or more parameters associated with the multimedia content comprise one or more content identifiers;

initiating a search for a social media tag associated with the multimedia content; and identifying the social media tag associated with the multimedia content from a database of social media tags, wherein the database comprises an association between each of the social media tags and one or more content parameters, and wherein the social media tag associated with the multimedia content comprises a social media tag that is associated with one or more content parameters matching at least one of the one or more parameters associated with the multimedia content; and outputting a notification to a display, wherein the notification comprises an identification of the social media tag identified from the image of the social media tag and an identification of the social media tag associated with the one or more parameters associated with the multimedia content, and wherein the notification comprises a user-selectable option for following one or more of the social media tags identified within the notification;

receiving a user selection of the option to follow one or more of the social media tags identified within the notification;

retrieving media associated with the one or more social media tags; and outputting the media associated with the one or more social media tags to the display until the media device is tuned away from the channel.

9. The one or more non-transitory computer-readable media of claim 8, wherein identifying the social media tag associated with the multimedia content comprises:
   detecting a social media tag identifier within closed caption text associated with the received content stream; and
   identifying the social media tag associated with the social media tag identifier.

10. The one or more non-transitory computer-readable media of claim 8, wherein the social media tag is output to the display as a user interface that is presented over a display of the multimedia content.

11. The one or more non-transitory computer-readable media of claim 8, wherein the social media tag is output to a messaging account associated with a user.

* * * * *